United States Patent Office 3,095,411
Patented June 25, 1963

3,095,411
3-ENOL ETHERS OF 6-HYDROXYMETHYL-3-OXO-Δ⁴-STEROIDS AND PROCESS FOR THEIR PREPARATION
David Neville Kirk and Vladimir Petrow, London, England, assignors to The British Drug Houses Limited
No Drawing. Filed Nov. 6, 1961, Ser. No. 150,176
Claims priority, application Great Britain Nov. 7, 1960
31 Claims. (Cl. 260—239.55)

This invention is for improvements in or relating to organic compounds and has particular reference to steroidal materials containing an additional carbon substituent at $C_6$.

It is an object of the present invention to provide a new and general process for the preparation of a new series of steroidal products which may be regarded structurally as the 3-enol ethers of 6-hydroxymethyl-3-oxo-Δ⁴-steroids.

We have made the surprising discovery that the steroidal products of our copending application No. 150,140 filed November 6, 1961 which may be regarded structurally as the 3-enol ethers of 6-formyl-3-oxo-Δ⁴-steroids may be converted by the process of this invention into the corresponding 6-hydroxy methyl derivatives.

This is a discovery of outstanding importance in the field of steroid technology. Many of the herein described derivatives possess valuable biological properties which render them of value in, for example, the veterinary field. Thus, for example, the derivatives of 17β-hydroxyandrostane which fall within the scope of the present invention may possess anabolic, androgenic and claudogenic properties. The derivatives of 17α-acyloxypregnan-20-one which fall within the scope of the present invention may possess progestational properties when administered by the oral route. The derivatives of 16α,17α-isopropylidenedioxypregnan-20-one may likewise show progestational activity as well as claudogenic activity. Claudogenic activity will, in general, also be shown by derivatives of 9α-fluoropregnan-11β,17α,21-trihydroxy-20-one, 17α,21-dihydroxypregnane-11,20-dione, 11β,17α,21-trihydroxypregnane-20-one and by the 21-acyl and 17,21-diacylderivatives thereof. In addition, such compounds may show glucocorticoid activity.

The compounds of the present invention form exceptionally convenient intermediates for the preparation of the therapeutically valuable 6α-methyl steroidal hormones of the androstane and pregnane series, which compounds are now well-known in clinical practice, and into which they may be converted by the following series of transformations. Firstly, by treatment with H⁺ ions, they are transformed into the corresponding 6-methylene-3-oxo-Δ⁴-steroids. The last group of compounds on catalytic hydrogenation followed by treatment with very dilute ethanolic hydrochloric acid, or potassium hydroxide, then yields the requisite 6α-methyl-3-oxo-Δ⁴-steroids. In addition the products of the present invention represent entirely new types of steroidal materials which themselves possess intrinsic value as "building blocks" for other types of steroidal materials containing a $C_6$ carbon substituent. Thus, for example, they may be expected to react with a variety of reagents such as the halogens, peracids and to undergo hydrogenation. The numerous possibilities for reaction possessed by the products of the present invention will be apparent to those skilled in the art.

It is a further object of the present invention to provide pharmaceutical preparations of the biologically active materials.

The present invention provides new 3-enol ethers of 6-hydroxymethyl-3-oxo-Δ⁴-steroids including the Formula I below.

The invention provides the following new products:

21-acetoxy-3-ethoxy-17α-hydroxy-6-hydroxymethylpregna-3,5-diene-11,20-dione 21-acetoxy - 17α - hydroxy-6-hydroxymethyl-3-methoxypregna-3,5-diene-11,20-dione 21-acetoxy - 17α - hydroxy - 3 - [β - hydroxyethoxy] - 6-hydroxymethylpregna-3,5-diene-11,20-dione 17α,21 - diacetoxy - 6 - hydroxymethyl - 3 - methoxypregna-3,5-diene-11,20-dione which are of value on account of their claudogenic activity and as intermediates for the preparation of the corresponding 3-oxo-Δ⁴-6-methylenic corticoids 17α,21-dihydroxy - 6 - hydroxymethyl - 3 - methoxypregna-3,5-diene-11,20-dione 17,21-acetonide 17,20:20,21-bismethylenedioxy - 3 - ethoxy - 6 - hydroxymethylpregna-3,5-diene-11-one which is of value as an intermediate for the preparation of the corresponding 6-methylenic corticoid into which it may be converted by procedures described above or by methods of prior art 17α - acetoxy - 6 - hydroxymethyl - 3 - methoxy-16-methylenepregna-3,5-dien-20-one 17α-acetoxy - 6 - hydroxymethyl - 3 - methoxypregna-3,5-dien-20-one 17α-acetoxy - 6 - hydroxymethyl - 3 - methoxy-16α-methylpregna-3,5-dien-20-one which are of value on account of their progestational properties 3-ethoxy-6-hydroxymethyl-16α,17α - isopropylidenedioxypregna-3,5-dien-20-one 6-hydroxymethyl-3-methoxypregna-3,5-dien-20-one which are of value on account of their progestational and claudogenic properties 17β - acetoxy-3-ethoxy-6-hydroxymethyl-2α-methylandrosta-3,5-diene 17β - acetoxy - 6 - hydroxymethyl-3-methoxyandrosta-3,5-diene 3-ethoxy-6-hydroxymethyl-17β-propionoxy - 17α - (prop-1'-ynyl)-androsta-3,5-diene 17β-acetoxy - 3 - benzyloxy - 6 - hydroxymethylandrosta-3,5-diene 17β - acetoxy - 3 - ethoxy-6-hydroxymethyl-19-norandrosta-3,5-diene 17β-acetoxy-3-methoxy-6-hydroxymethyl - 19 - norandrosta-3,5-diene 17β-acetoxy - 3 - ethoxy - 6 - hydroxymethylandrosta-3,5-diene which are of value on account of their androgenic/anabolic/claudogenic activity 6-hydroxymethyl-3-methoxy - 16 - methylpregna - 3,5,16-trien-20-one 20β-acetoxy-3-ethoxy-6-hydroxymethylpregna-3,5-diene 11α,17β - diacetoxy-6-hydroxymethyl-3-methoxyandrosta-3,5-diene 3-ethoxy - 6 - hydroxymethylpregna - 3,5,17(20)-trien-21-oic acid ethyl ester 6-hydroxymethyl-3-methoxyandrosta-3,5 - dien - 17 - one which are of value as novel intermediates which may be converted into many other novel materials by such procedures as reduction, hydrogenation and oxidation The 3-enol methyl ether of 6-hydroxymethyltestololactone which is of value as an intermediate and on account of its claudogenic activity 21-acetoxy - 6 - hydroxymethyl - 3 - methoxypregna - 3,5- dien-20-one which is of value on account of its claudogenic activity and as an intermediate for the preparation of 6-methyldesoxycorticosterone According to the present invention there is provided a process for the preparation of 3-enol ethers of 6-hydroxymethyl-3-oxo-$\Delta^4$-steroids including the formula

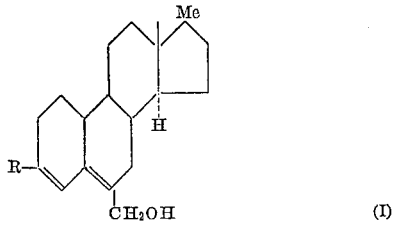

where R is O-alkyl, O-hydroxyalkyl, O-cycloalkyl, O-alkaryl or a functional derivative thereof which process comprises reducing the corresponding 3-enol ether of a 6-formyl-3-oxo-$\Delta^4$-steroid including the formula

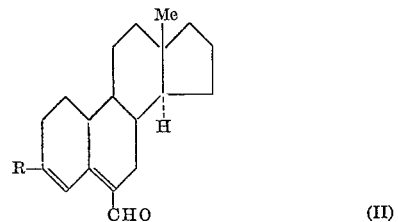

where R has the same meaning as above.

A wide variety of reducing agents may be used for converting the 6-formyl derivatives (II) which form the starting materials of the invention, into the 6-hydroxymethyl derivatives (I) which form the products of the present invention. Such reducing agents, however, must not be acidic in character, nor must they be used in an acidic environment as the resulting 6-hydroxymethyl derivatives (I) are very sensitive to acids which convert them into the corresponding 6-methylene-3-oxo-$\Delta^4$-steroids.

Conversion of 6-formyl derivatives (II) additionally substituted by systems sensitive to both reduction and alkaline hydrolysis such as .COCH$_2$OAc is conveniently achieved catalytically employing Raney nickel as catalyst. As Raney nickel, as normally prepared, is strongly alkaline in reaction, it is advisable to free it from alkali before use otherwise concomitant hydrolysis of the acylated ketal system may occur. This may be done by any method known to those skilled in the art such, for example, as treating it with ethyl acetate. This method of reduction is generally useful.

Platinum on charcoal in the presence of a sodium acetate buffer represents another valuable catalyst for catalytic hydrogenation. Thus, for example, it may be used to catalytically hydrogenate the 6-formyl group in such compounds as 21-acetoxy-6-formyl-17α-hydroxy-3-methoxypregna-3,5-diene-11,20-dione and 21-acetoxy-6-formyl-3-methoxypregna-3,5-dien-20-one.

Organometallic hydrides such for example as lithium, sodium, magnesium and calcium borohydrides, lithium aluminium hydride and tritertbutoxy aluminium hydride represent another group of reducing agents which are particularly valuable for reducing the 6-formyl group in 17α-acyloxypregnan-20-one derivatives. Lithium cyanoborohydride may be valuable in certain instances.

The Ponndorf method of reduction may be employed for reducing 6-formyl derivatives that do not contain additional carbonyl groups. Other methods of reduction may be found in standard works of reference such as Houben-Weyl.

The 6-formyl derivatives (II) which form the starting materials of the present invention are prepared by the process of our copending application No. 150,140. In this process the 3-enol ether of a 3-oxo-$\Delta^4$-steroid including the formula

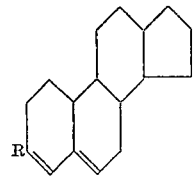

(where R has the meaning hereinabove defined) is treated with the Vilsmeir reagent (see Houben-Weyl Methoden der Organische Chemie, 4th ed., 1954, vol. 7(1), page 29 et seq.) preferably at approximately 0° C. and in a solvent such as methylene chloride and the resulting iminium salt decomposed by pouring in e.g. sodium acetate, when the 6-formyl derivatives (II) are obtained. As described in our copending application the 6-formyl group may be introduced into the 3-enol ethers of steroidal 3-oxo-$\Delta^4$-enes which may be additionally substituted by Hydroxyl and acyloxy groups and functional derivatives thereof in such positions as 11, 12, 16 (including 16-hydroxy methyl), 14, 15, 17, 18, 19, 20 and 21 (including the condensation products of 16α, 17α-glycols with carbonyl components). Thiol groups at $C_{16}$ are unaffected.

Carbonyl groups such for example as carbonyl groups at 11, 12, 15, 16, 17, 18 and 20.

Carbalkoxy groups at $C_{13}$, $C_{16}$, $C_{17}$ or in the sidechain.

Cyano groups at $C_{13}$, $C_{16}$ and $C_{17}$.

Alkyl groups, in particular Me groups at $C_2$, $C_{11}$, $C_{16}$, $C_{17}$, $C_{21}$, and ethyl at $C_{17}$.

Alkenyl and alkynyl groups in particular vinyl and allyl at $C_{17}$, propynyl and chlorethynyl at $C_{17}$.

Methylene and ethylidene groups at $C_{11}$, $C_{16}$ and $C_{17}$ groups such as benzylidene at $C_{21}$.

Lactone, ether and spiroketal residues: Spirolactone residues such as —O.CO.CH$_2$.CH$_2$—attached to $C_{17}$, etheric groups at $C_{16}$, and bridging $C_{18}$ and $C_{20}$, spiroketal moieties such as are present in diosgenine, 20,20-ethylenedioxy groups, 17,17-ethylenedioxy groups and similar functional derivatives.

Halogen groups and in particular chlorine and fluorine at $C_9$, $C_{16}$ and $C_{21}$.

Unsaturated linkages in particular at $C_{9(11)}$, $C_{11}$, $C_{14}$, $C_{16}$ and $C_{17(20)}$.

Ketol groups in particular acylated ketol groups at $C_{16}$—$C_{17}$, $C_{17}$—$C_{20}$ and $C_{20\text{-}21}$.

Cortical side chains, both acylated, or converted into such 'protective' derivatives as bismethylenedioxy, cyclic-carbonates, cyclic acetonides or orthoformates.

Epoxides and halohydrins, particularly at $C_{16\text{-}17}$.

In reducing 6-formyl derivatives containing the foregoing substituents care should be taken by those skilled in the art in the choice of an appropriate reductant.

The process of the invention may be applied to the 6-formyl derivatives derived from the following steroids and acyl derivatives thereof.

Testosterone
2-methyltestosterone
17α-methyltestosterone
9(11)-dehydro-17α-methyltestosterone
17α-propynyltestosterone
17α-acyloxyprogesterone
9(11)-dehydro-17α-acyloxyprogesterone
16-methyl-17α-acyloxyprogesterone
9(11)-dehydro-16-methyl-17α-acyloxyprogesterone
16-methylene-17α-acyloxyprogesterone
9(11)-dehydro-16-methylene-17α-acyloxyprogesterone
17α-acyloxy-16-ethylideneprogesterone
16α,17α-dimethylmethylenedioxyprogesterone 9(11)-dehydro-16α,17α-dimethylmethylenedioxyprogesterone
Cortisone
16-methylcortisone
21-methylcortisone
16-methylenecortisone
16α-hydroxy cortisone and the (16α, 17α)-acetonide thereof
Hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,21-dihydroxypregna-4,9(11)-diene-3,20-dione and the (16,17)-acetonide thereof
21-fluoro-17α-hydroxypregna-4,9(11)-diene-3,20-dione and the (16,17)-acetonide thereof
21-fluoro-17α-hydroxypregn-4-ene-3,11,20-trione and the (16,17)-acetonide thereof
21-fluoro-11,17α-dihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dienoic acid (esters)
3,11-dioxopregna-4,17-dienoic acid (esters)
11-hydroxy-3-oxopregna-4,17-dienoic acid (esters)
9(11)-dehydro-3-oxopregna-4,17-dienoic acid (esters)
21-fluoro-17α-acyloxyprogesterone
Progesterone
16-methylprogesterone
11-oxoprogesterone
9(11)-dehydroprogesterone
21-methylprogesterone
Diosgenone
17α-cyano-17β-hydroxyandrost-4-en-3-one
16-methyl-16,17-dehydroprogesterone
16-cyano-progesterone
16-carbalkoxyprogesterone
16-hydroxymethylprogesterone
3-(3-oxo-17β-hydroxyandrost-4-en-17α-yl)propionic acid
21-fluoroprogesterone
Testololactone
16-fluoro-corticoids The 9α-fluoro derivatives of the above 11α-hydroxy and 11-oxo-steroids.

Following is a description by way of example of methods of carrying the invention into effect.

EXAMPLE 1

*Preparation of 3-Ethoxy-6-Hydroxymethyl-16α,17α-Isopropylidenedioxypregna-3,5-Dien-20-One*

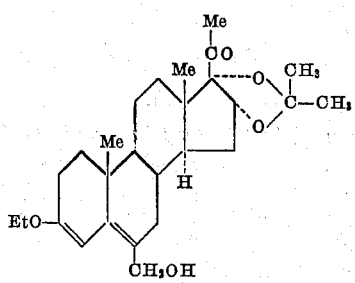

3 - ethoxy - 6 - formyl - 16α,17α - isopropylidenedioxypregna-3,5-dien-20-one (2.0 g.) in dry tetrahydrofuran (15 ml.) was stirred with lithium borohydride (300 mg.) for 10 minutes. The mixture was then poured into water and the gummy product thus obtained extracted with ether, the extract washed neutral, dried (sodium sulphate) and evaporated in vacuo. The crystalline solid thus obtained was purified from acetone/hexane (containing a drop of pyridine) to give 3-ethoxy-6-hydroxymethyl-16α,17α - isopropylidenedioxypregna - 3,5 - dien - 20-one, hard leaflets, M.P. 163 to 164° C., $\gamma_{max.}^{Nujol}$ 3575, 1710, 1660, 1625 cm.$^{-1}$

EXAMPLE 2

*Preparation of 17α;20:20,21-Bismethylenedioxy-3-Ethoxy-6-Hydroxymethylpregna-3,5-Dien-11-One*

17α,20:20,21 - bismethylenedioxy - 3 - ethoxy - 6 - formylpregna-3,5-dien-11-one (1 g.) was reduced with sodium borohydride (0.1 g.) in tetrahydrofuran (10 ml.) and methanol (2 ml.) for 15 minutes at room temperature. The reaction mixture was poured into water, the product was extracted into ether, the extract was washed with water, dried over anhydrous sodium sulphate and evaporated to dryness under reduced pressure. The residue, crystallised from aqueous methanol, yielded 17α,20:20,21 - bismethylenedioxy - 3 - ethoxy - 6 - hydroxymethylpregna-3,5-dien-11-one, as flakes, M.P. 201 to 203° C., $[\alpha]_D^{25}$ —175° (c. 0.77. in CHCl$_3$)

$\lambda_{max.}^{EtOH}$ 248.5 mμ ( ε 18,880)

EXAMPLE 3

*Preparation of 6-Hydroxymethyl-3-Methoxypregna-3,5-Dien-20-One*

6-formyl-3-methoxypregna-3,5-dien-20-one (5 g.) was hydrogenated in methanol (150 ml.) over pre-reduced Raney nickel (5 ml. of settled suspension). The catalyst was removed by filtration, the filtrate was concentrated to small volume under vacuum and poured into water. The precipitated gum was extracted into ether, the extract was washed with water, dried over anhydrous sodium sulphate and evaporated to dryness. 6-hydroxymethyl-3-methoxypregna-3,5-dien-20-one crystallised from aqueous acetone as flakes, M.P. 112 to 114° C., $\lambda_{max.}^{EtOH}$ 250 mμ ( ε 18,890)

[α] —96.5° (c. 0.87 in dioxan).

EXAMPLE 4

*Preparation of 17β-Acetoxy-3-Ethoxy-6-Hydroxymethyl-2α-Methylandrosta-3,5-Diene*

17β - acetoxy - 3 - ethoxy - 6 - formyl - 2α - methylandrosta-3,5-diene (4 g.) in anhydrous tetrahydrofuran (50 ml.) was treated with lithium borohydride (0.6 g.). The mixture was stirred for 10 minutes at room temperature, and then poured into water when the solids were collected, and purified from aqueous methanol. 17β-acetoxy - 3 - ethoxy - 6 - hydroxymethyl - 2α - methylandrosta-3,5-diene formed prisms, M.P. 140 to 141° C., $[\alpha]_D^{25}$ —138° (c. 0.81 in dioxan)

$\lambda_{max.}^{EtOH}$ 252 mμ ( ε 19,730)

EXAMPLE 5

*Preparation of 17α-Acetoxy-6-Hydroxymethyl-3-Methoxy-16-Methylenepregna-3,5-Dien-20-One*

17α - acetoxy - 6 - formyl - 3 - methoxy - 16 - methylenepregna-3,5-dien-20-one (1 g.) was dissolved in tetrahydrofuran (10 ml.) containing lithium borohydride (0.2 g.), stirred for 10 minutes, and the mixture poured into water. The precipitated solids were collected and purified from aqueous methanol containing pyridine to give 17α - acetoxy - 6 - hydroxymethyl - 3 - methoxy - 16 - methylenepregna-3,5-dien-20-one, needles, M.P. 171 to 173° C., $[\alpha]_D$ —252° (c. 1.04 in chloroform), $$\lambda_{max.}^{EtOH}\ 246.5\ m\mu\ (\epsilon\ 19,160)$$

EXAMPLE 6

*Preparation of 3-Methoxy-6-Hydroxymethyl-16-Methyl-pregna-3,5,16-Trien-20-One*

A solution of 6-formyl-3-methoxy-16-methylpregna-3,5,16-trien-20-one (600 mg) in dry tetrahydrofuran (10 ml.) was treated with crushed lithium borohydride (100 mg.) while stirring. The mixture was stirred for a period of 10 minutes while cooling the flask externally with cold water. Following this, the solution was extracted with ether (100 ml.) and the latter washed several times with portions of water, dried and evaporated. The product was recrystallised twice from benzene, M.P. 130 to 136° C., $[\alpha]_D^{25}$ —84° (c. 0.97 in dioxan)

$$\lambda_{max.}^{EtOH}\ 247\ m\mu\ (\epsilon\ 15,080)\ \gamma_{max.}\ 3350,\ 1650\ \text{and}\ 1625\ cm.^{-1}$$

EXAMPLE 7

*Preparation of 17β-Acetoxy-6-Hydroxymethyl-3-Methoxyandrosta-3,5-Diene*

17β - acetoxy - 6 - formyl - 3 - methoxyandrosta - 3,5-diene (20 g.) in dry tetrahydrofuran (150 ml.) was stirred with lithium borohydride (3 g.) for 10 minutes when the mixture was poured into water, and extracted with ether. The product solidified on removing the solvent. It was purified from aqueous methanol (containing a drop of pyridine) to give 17β-acetoxy-6-hydroxymethyl-3-methoxyandrosta-3,5-diene, prisms, M.P. 144 to 149° C., $$\lambda_{max.}^{EtOH}\ 249\ \text{to}\ 250\ m\mu\ (\epsilon\ 19,750)$$

$[\alpha]_D^{24}$ —136° (c. 1.01 in dioxan).

EXAMPLE 8

*Preparation of 17α-Acetoxy-6-Hydroxymethyl-3-Methoxypregna-3,5-Dien-20-One*

17α - acetoxy - 6 - formyl - 3 - methoxypregna - 3,5 - dien-20-one (5 g.) was added to a stirred suspension of lithium borohydride (0.5 g.) in anhydrous tetrahydrofuran (100 ml.). After 5 minutes the mixture was poured into water. The product was extracted with ether and purified from aqueous methanol containing a drop of pyridine to give 17α-acetoxy-6-hydroxymethyl-3-methoxypregna-3,5-dien-20-one in prisms, M.P. 197 to 201° C., $[\alpha]_D^{24}$ —137° (c. 0.80 in CHCl₃ +1% pyridine), $$\lambda_{max.}\ 249.5\ m\mu\ (\epsilon\ 19,660),\ \gamma_{max.}^{CH_2Cl_2}1729,\ 1713,\ 1646\ \text{and}\ 1616\ cm.^{-1}$$

EXAMPLE 9

*Preparation of 6-Hydroxymethyl Cortisone Acetate 3-Enol Ethyl Ether*

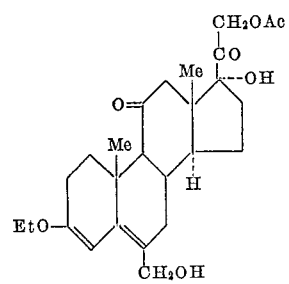

Raney nickel sludge (1 ml.) was washed with methanol followed by ethyl acetate, then treated with ethyl acetate (10 ml.) and saturated with hydrogen at atmospheric pressure and room temperature. 21-acetoxy-3-ethoxy-6-formyl-17α-hydroxypregna-3,5-diene-11,20-dione in methanol (50 ml.) was added, and hydrogenation continued until 180 ml. (1.2 mol.) of hydrogen had been absorbed. The catalyst was removed, the filtrate was diluted with ether and washed with water, and the solvents were removed under reduced pressure to yield 6-hydroxymethyl cortisone acetate 3-enol ethyl ether, $[\alpha]_D^{25}$ +18° (c. 0.74 in dioxan), $$\lambda_{max.}\ 249.5\ m\mu\ (\epsilon\ 12,800),\ \gamma_{max.}^{Nujol}\ 3400,\ 1751,\ 1728,\ 1706,\ 1649\ \text{and}\ 1619\ cm.^{-1}$$

EXAMPLE 10

*Preparation of 3-Ethoxy-6-Hydroxymethyl-16α,17α-Isopropylidene-Dioxypregna-3,5-Dien-20-One*

3 - ethoxy - 6 - formyl - 16α,17α - isopropylidenedioxy-pregna-3,5-dien-20-one (900 mg.) in pure dry dioxan (20 ml.) was treated with lithium cyanoborohydride (540 mg.) (Drehfall and Keil, J. Prak. Chem. 1958, 6, 80) and the mixture heated at 100° C. for 24 hours. The cooled mixture was poured into water and the gummy product extracted with ether. The extract was washed neutral (emulsification being overcome by addition of a little sodium chloride), dried (sodium sulphate) and evaporated in vacuo. The gummy solid thus obtained was crystallised from acetone/hexane containing a drop of pyridine to give 3-ethoxy-6-hydroxymethyl-16α,17α-isopropylidenedioxypregna-3,5-dien-20-one, prisms, M.P. 162 to 163° C., identical with the sample prepared as described in Example 1.

EXAMPLE 11

*Preparation of 17β - Acetoxy - 6 - Hydroxymethyl-3-Methoxyandrosta-3,5-Diene (by hydrogenation of 17α-acetoxy-6-formyl-3-methoxyandrosta-3,5-diene with Raney nickel)*

Raney nickel (1 g.) was washed twice with ethyl acetate by decantation. It was treated with ethyl acetate (10 ml.) and saturated with hydrogen at room temperature and atmospheric pressure. A solution of 17β-acetoxy-6-formyl-3-methoxyandrosta-3,5-diene (3 g.) in methanol (50 ml.) was added, and hydrogenation was continued until the absorption of hydrogen reached 225 ml. (1.125 moles). The catalyst was removed by filtration, and the filtrate diluted with ether and washed with water. Removal of the solvent gave 17β-acetoxy-6-hydroxymethyl-3-methoxyandrosta-3,5 - diene which was purified from aqueous methanol (70%) containing a drop of pyridine. The 6-hydroxymethyl derivative was obtained as prisms, M.P. 145 to 149° C.

EXAMPLE 12

*Preparation of 17β-Acetoxy-3-Benzyloxy-6-Hydroxymethylandrosta-3,5-Diene*

Reduction of 17β - acetoxy - 3-benzyloxy-6-formyl androsta-3,5-diene (3 g.) in tetrahydrofuran (25 ml.) and methanol (5 g.) with sodium borohydride (0.5 g.) for 7 minutes at room temperature, followed by precipitation into water, extraction with ether, and evaporation of the solvent, gave the 6-hydroxymethyl derivative, which separated from ethanol containing 1% pyridine in hexagonal plates, M.P. 128 to 130° C., $[\alpha]_D^{21}$ —155° (c. 0.93 in dioxan), $$\lambda_{max.}^{EtOH}\ 251\ m\mu\ (\epsilon\ 21,440)$$

EXAMPLE 13

*Preparation of 17α-Acetoxy-16-Ethylidene-6-Hydroxymethyl-3-Methoxypregna-3,5-Dien-20-One*

Reduction of 17α - acetoxy - 16 - ethylidene - 6 - formyl-3-methoxypregna-3,5-dien-20-one with sodium borohydride (as in Example 12) gave the corresponding 6-hydroxymethyl derivative, $$\lambda_{max.}\ 250\ m\mu\ (\epsilon=20,100)$$

EXAMPLE 14

*Preparation of 21-Acetoxy-6-Hydroxymethyl-17α-Hydroxy-3-(2'-Hydroxyethoxy)-Pregna-3,5-Diene-11,20-Dione*

Hydrogenation of 21-acetoxy-6-formyl-17α-hydroxy-3-(2'-hydroxyethoxy)-pregna-3,5-diene-11,20-dione according to the process of Example 9 gave the 6-hydroxymethyl derivative $[\alpha]_D^{25}$ +26° (c. 0.87 in dioxan)

$\lambda_{max.}$ 249 m$\mu$ ($\epsilon$ 18,000)

EXAMPLE 15

*Preparation of 3-Ethoxy-6-Hydroxymethyl-17β-Propionoxy-17α-(Prop-1'-Ynyl)Androsta-3,5-Diene*

A solution of 3-ethoxy-6-formyl-17β-propionoxy-17α-(prop-1'-ynyl)androsta-3,5-diene (3 g.) in methanol (60 ml.) was treated with sodium borohydride (750 mg.) and left at room temperature for 30 minutes. Acetic acid (0.5 ml.) was added, followed by much water.

The precipitated solid was recrystallised from methanol to give 3-ethoxy-6-hydroxymethyl-17β-propionoxy-17α-(prop-1'-ynyl)androsta-3,5-diene, prisms, M.P. 156 to 158° C., $\gamma_{max.}^{Nujol}$ 3500, 1730, 1650 and 1625 cm.$^{-1}$ $[\alpha]_D^{25}$ −207° (c. 1.06 in chloroform).

EXAMPLE 16

*Preparation of 21-Acetoxy-17α-Hydroxy-3-Methoxy-6-Hydroxy-Methylpregna-3,5,9(11)-Triene-20-One*

21 - acetoxy - 17α - hydroxy - 3 - methoxy - 6 - formylpregna-3,5,9(11)-triene-20-one (1.7 g.) was hydrogenated in methanol (100 ml.) and ethyl acetate (15 ml.) over Raney nickel (1 ml. settled sludge) which had been previously washed with methanol and ethyl acetate and saturated with hydrogen. Absorption of hydrogen was allowed to continue until 1.2 mols had been absorbed, when the catalyst was removed and the mixture diluted with ethyl acetate, washed with water, and the solvent removed under reduced pressure, to give 21-acetoxy-17α-hydroxy - 6 - hydroxymethyl - 3 - methoxypregna - 3,5,9(11)-trien-20-one, $\lambda_{max}$ 249 m$\mu$ ($\epsilon$=19,000)

EXAMPLE 17

*Preparation of 17β-Hydroxy-3-Methoxy-6-Hydroxymethylandrosta-3,5-Diene*

Reduction of 17β - hydroxy - 3 - methoxy-6-formyl-androsta-3,5-diene (1 g.) with sodium borohydride (0.1 g.) in tetrahydrofuran (12 ml.) and methanol (3 ml.) for 5 minutes, followed by dilution with water, gave the 6-hydroxymethyl derivative which was purified from aqueous methanol $\lambda_{max.}$ 249 m$\mu$ ($\epsilon$=19,200)

EXAMPLE 18

*Preparation of 20β-Acetoxy-3-Ethoxy-6-Hydroxymethyl-pregna-3,5-Diene*

A solution of 20β - acetoxy - 3 - ethoxy - 6 - formyl-pregna-3,5-diene (3.4 g.) in tetrahydrofuran (25 ml.) and methanol (5 ml.) was treated with sodium borohydride (0.25 g.) at room temperature for 10 minutes. The product was isolated as described in Example 10 and crystallised from aqueous methanol containing a trace of pyridine to give 20β-acetoxy-3-ethoxy-6-hydroxymethylpregna-3,5-diene, as needles, M.P. 142 to 144° C., $[\alpha]_D^{25}$ −126° (c. 0.9 in dioxan)

$\lambda_{max.}^{EtOH}$ 249 m$\mu$ ($\epsilon$ 19,120)

EXAMPLE 19

*Preparation of 17α-Acetoxy-6-Hydroxymethyl-3-Methoxy-16α-Methylpregna-3,5-Dien-20-One*

17α - acetoxy - 6 - formyl - 3 - methoxy - 16α - methylpregna-3,5-dien-20-one (1 g.) was dissolved in anhydrous tetrahydrofuran containing lithium borohydride (50 g.) and the solution stirred at room temperature for 5 minutes. The product was precipitated by the addition of water and crystallised from aqueous methanol to give 17α - acetoxy - 6 - hydroxymethyl - 3 - methoxy - 16α - methylpregna-3,5-dien-20-one as plates M.P. 202 to 204° C., $[\alpha]_D$ −147° (c. 0.52 in chloroform), $\lambda_{max.}^{EtOH}$ 246.5 m$\mu$ ($\epsilon$ 19,460)

EXAMPLE 20

*21-Acetoxy-6-Hydroxymethyl-3-Methoxypregna-3,5-Dien-20-One*

A solution of 21-acetoxy-6-formyl-3-methoxypregna-3,5-dien-20-one (1 g.) and sodium acetate (0.25 g.) in methanol (50 ml.) was shaken with 5% platinum on charcoal (0.2 g.) in an atmosphere of hydrogen until absorption of gas ceased. After removal of the catalyst, the solution was poured into water and the precipitated solids were collected. Crystallisation from aqueous methanol containing a trace of pyridine gave 21-acetoxy-6-hydroxymethyl-3-methoxypregna-3,5-dien-20-one as laths, M.P. 128 to 130° C., $[\alpha]_D^{28}$ −53.3 (c. 0.95 in dioxan), $\lambda_{max.}^{EtOH}$ 248.5 to 250.5 m$\mu$ ($\epsilon$ 18,280)

EXAMPLE 21

*6-Hydroxymethyl Cortisone 17α,21-Diacetate 3-Methyl Enol Ether*

A stirred solution of 6-formylcortisone-17α,21-diacetate methyl enol ether (486 mg.) in dry tetrahydrofuran (8 ml.) was treated with lithium borohydride in tetrahydrofuran (0.44 ml. of a solution containing 25 mg. borohydride per ml.). After continuing to stir for five minutes, the solution was diluted with water and extracted with methylene chloride. Drying and evaporation of the extracts gave 17α,21-diacetoxy-6-hydroxymethyl-3-methoxy-pregna-3,5-diene-11,20-dione as an amorphous material, $\gamma_{max.}^{CH_2Cl_2}$ 3600, 3450, 1615, 1660, 1750 and 1710 cm.$^{-1}$

EXAMPLE 22

*6-Hydroxymethyl-3-Methoxy-17β-Acetoxy-19-Norandrosta-3,5-Diene*

Lithium borohydride (0.15 g.) was added to a solution of 6 - formyl-3-methoxy-17β-acetoxy-19-norandrosta-3,5-diene (1.0 g.) in dry tetrahydrofuran (7.5 ml.) and the mixture was stirred for 10 minutes and poured into water. Ether extraction and evaporation of the solvent yielded 6-hydroxymethyl - 3 - methoxy - 17β - acetoxy-19-norandrosta-3,5-diene as a gum, $\lambda_{max.}$ 249.5 mμ, $\gamma_{max.}^{CCl_4}$ 3610, 1740, 1648, 1620, 1452, 1389, 1371 cm.$^{-1}$, $\gamma_{max.}^{CS_2}$ 1244, 1202, 1191, 1041, 1022 cm.$^{-1}$

EXAMPLE 23

*6-Hydroxymethyl-3-Ethoxy-17β-Acetoxy-19-Nor-Androsta-3,5-Diene*

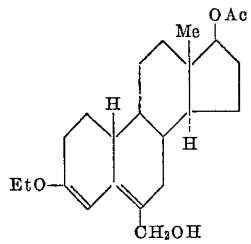

A solution of 6-formyl-3-ethoxy-17β-acetoxy-19-nor-androsta-3,5-diene (3.06 g.) in tetrahydrofuran (15 ml.) was added to lithium borohydride (0.46 g.) in tetrahydrofuran (10 ml.) at room temperature and the mixture was stirred for 10 minutes and then poured into water. Ether extraction and evaporation of the solvent yielded a gum which solidified when triturated with methanol. Recrystallisation from methanol containing a few drops of pyridine yielded a 6-hydroxymethyl-3-ethoxy-17β-acetoxy-19-nor-androsta-3,5-diene, $\lambda_{max.}$ 251 mμ (ε 19,320), $\gamma_{max.}^{CCl_4}$ 3620, 1742, 1648, 1622, 1477, 1450, 1439, 1385, 1373 cm.$^{-1}$. $\gamma_{max.}^{CS_2}$ 1293, 1244, 1203, 1189, 1159, 1126, 1115, 1085, 1044, 1024, 999, 965, 910, 811, 690 cm.$^{-1}$.

EXAMPLE 24

*3-Ethyl-Enol Ether of 6-Hydroxymethylpregna-4,17(20)-Dien-3-One-21-Oate Ethyl Ester*

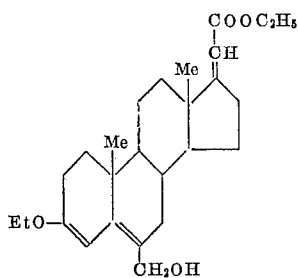

A solution of the 3-ethyl enol ether of 6-formylpregna-4,17(20)-dien-3-one-21-oate ethyl ester (1.0 g.) in tetrahydrofuran (10 ml.) was added to a suspension of lithium borohydride (0.15 g.) in tetrahydrofuran (5 ml.) at room temperature, and the mixture was stirred for 10 minutes and then poured into water. Ether extraction and evaporation of the solvent yielded the 3-ethyl-enol ether of 6-hydroxymethylpregna-4,17(20)-dien-3-one-21-oate ethyl ester, $\gamma^{CCl_4}$ 1710, 1656, 1647, 1622 cm.$^{-1}$.

EXAMPLE 25

*β-(17β-Hydroxy-3-Ethoxy-6-Hydroxymethylandrosta-3,5-Dien-17α-Yl)Propionic Acid Lactone*

β - (17β - hydroxy-3-ethoxy-6-formylandrosta-3,5-dien-17α-yl)propionic acid lactone (1.0 g.) in dry tetrahydrofuran (10 ml.) was treated with lithium borohydride (150 mg.) and the mixture stirred for 10 minutes after which it was poured into water and the product isolated with ether. The 6-hydroxymethyl derivative was obtained as a gum, $\gamma_{max.}^{Nujol}$ 3600, 1770, 1655, 1625 cm.$^{-1}$

EXAMPLE 26

*21-Acetoxy-17α-Hydroxy-6-Hydroxymethyl-3-Methoxypregna-3,5-Diene-11,20-Dione*

21 - acetoxy - 6-formyl-17α-hydroxy-3-methoxypregna-3,5-diene-11,20-dione (4 g.) was hydrogenated over a prereduced 5% platinum-charcoal catalyst (0.5 g.) in methanol (60 ml.) containing sodium acetate (0.5 g.). The absorption of hydrogen almost ceased at one mol, when the catalyst was removed by filtration, and the filtrate diluted with water to turbidity. The crystalline material which separated out was purified from aqueous methanol +1% pyridine to give 21-acetoxy-17α-hydroxy-6-hydroxymethyl-3-methoxypregna-3,5-diene-11,20-dione in solvated crystals, M.P. 126 to 130° C., $[\alpha]_D^{25}$ ±0° (c. 1.0 in dioxan), $\lambda_{max.}$ 248.5 mμ (ε=15,900) in ethanol.

EXAMPLE 27

*6-Hydroxymethyltestololactone 3-Enol Methyl Ether*

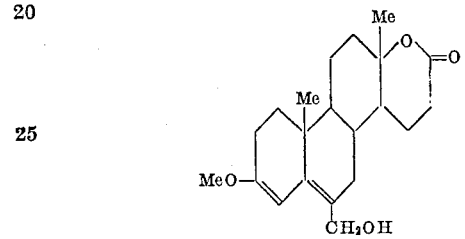

6-formyltestololactone 3-enol methyl ether (1 g.) in methanol (10 ml.) was treated with sodium borohydride (100 mg.) for 5 minutes then water was added until the product crystallised out. Purification from acetone/hexane gave 6-hydroxymethyltestololactone 3-enol methyl ether, $\lambda_{max.}$ 250 mμ (ε=19,200) in ethanol.

EXAMPLE 28

*11α,17β-Diacetoxy-6-Hydroxymethyl-3-Methoxyandrosta-3,5-Diene*

11α,17β - diacetoxy - 6 - formyl - 3 - methoxyandrosta-3,5-diene (250 mg.) reduced by the process of Example 27 gave 11α,17β-diacetoxy-6-hydroxymethyl-3-methoxyandrosta-3,5-diene, prismatic needles from aqueous methanol and 1% pyridine, M.P. 162 to 166° C., $[\alpha]_D^{26}$ −216° (c. 0.87 in dioxan) $\lambda_{max.}$ 249.5 mμ (ε=18,950) in ethanol.

EXAMPLE 29

*6-Hydroxymethylcortisone 17,21-Acetonide 3-Enol Methyl Ether*

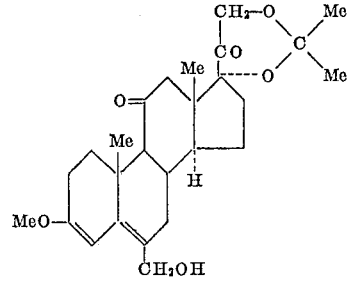

6-formylcortisone 17,21-acetonide 3-enol methyl ether (900 mg.) was hydrogenated in methanol (50 ml.) with Raney nickel catalyst (1 ml. settled sludge, washed with methanol and pre-hydrogenated) until absorption ceased at 65 ml. The catalyst was removed by filtration and the filtrate diluted with water until crystallisation began. The product was purified from aqueous methanol +1% pyridine to give 6-hydroxymethylcortisone 17,21-acetonide 3-enol methyl ether, feathery crystals, M.P. 174 to 180° C., $[\alpha]_D^{26}$ −45° (c. 0.93 in dioxan), $\lambda_{max.}$ 248 mμ

(ε=17,000)

in ethanol.

EXAMPLE 30

*21-Acetoxy-6-Hydroxymethyl-3-Methoxypregna-3,5,17(20)-Trien-11-One*

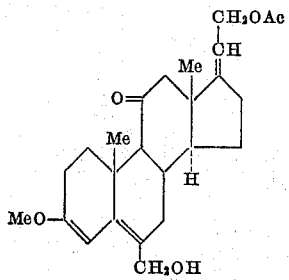

21-acetoxy-6-formyl-3-methoxypregna-3,5,17(20)-trien-11-one (1 g.) in anhydrous tetrahydrofuran (10 ml.) was treated with a solution of lithium borohydride (25 mg.) in tetrahydrofuran (2 ml.) for 10 minutes at room temperature then poured into water and the product isolated with ether. Crystallisation from aqueous methanol gave 21-acetoxy - 6 - hydroxymethyl - 3 - methoxypregna - 3,5,17(20)-trien-11-one, $\lambda_{max}$. 249.5 m$\mu$ ($\epsilon$=18,210) in ethanol.

EXAMPLE 31

*15α-Acetoxy-6-Hydroxymethyl-3-Methoxypregna-3,5-Dien-20-One*

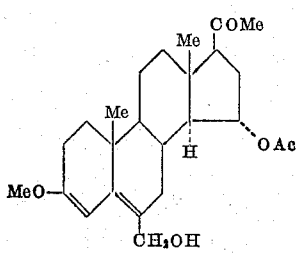

15α - acetoxy - 6 - formyl - 3 - methoxypregna - 3,5-diene-20-one hydrogenated over platinum-charcoal by the process of Example 26, gave 15α-acetoxy-6-hydroxymethyl-3-methoxypregna-3,5-dien-20-one, $\lambda_{max}$. 249.5 m$\mu$ ($\epsilon$=20,080)

in ethanol.

EXAMPLE 32

*17β-Acetoxy-3-Ethoxy-6-Hydroxymethylandrosta-3,5-Diene*

17β - acetoxy - 3 - ethoxy - 6 - formylandrosta - 3,5 - diene (10 g.) was treated in methanol (50 ml.) with sodium borohydride (0.5 g.) and stirred for 10 minutes, then the solution was diluted with water until crystallisation began. Purification from aqueous methanol and 1% pyridine gave 17β-acetoxy-3-ethoxy-6-hydroxymethylandrosta-3,5-diene, flakes, M.P. 114 to 119° C., $[\alpha]_D^{23}$ −163° (c. 0.90 in dioxan), $\lambda_{max}$. 251 m$\mu$ ($\epsilon$=20,050) in ethanol.

EXAMPLE 33

*17β-Acetoxy-3-(β-Ethoxyethoxy)-6-Hydroxymethylandrosta-3,5-Diene*

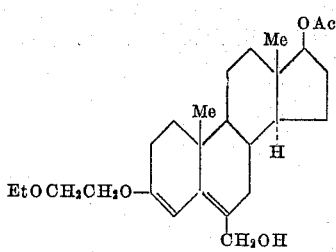

17β - acetoxy - 3 - (β - ethoxyethoxy) - 6 - formylandrosta-3,5-diene (10 g.) was treated in methanol (50 ml.) with sodium borohydride (0.5 g.) and stirred for 10 minutes, then the solution was diluted with water until crystallisation began. Purification gave 17β-acetoxy-3-(β-ethoxyethoxy) - 6 - hydroxy-methylandrosta-3,5-diene, $\lambda_{max}$. 250 m$\mu$ ($\epsilon$=20,170) in ethanol.

EXAMPLE 34

*16α,17β-Epoxy-6-Hydroxymethyl-3-Methoxypregna-3,5-Dien-20-One*

6 - formyl - 16α,17α - epoxy - 3 - methoxypregna - 3,5-diene-20-one was hydrogenated over platinum-charcoal by the process of Example 26, to give 16α,17α-epoxy-6-hydroxymethyl-3-methoxy-pregna-3,5-dien-20-one, $\lambda_{max}$. 249 m$\mu$ ($\epsilon$=20,100) in ethanol.

EXAMPLE 35

*3-Benzyloxy-6-Hydroxymethylandrosta-3,5-Dien-17β-Ol*

3-benzyloxy-6-formylandrosta-3,5-dien-17-one (2 g.) was reduced with sodium borohydride (0.4 g.) in methanol (20 ml.) for 15 minutes, then water was added until the product began to crystallise. Purification from aqueous methanol+1% pyridine gave 3-benzyloxy - 6 - hydroxymethylandrosta-3,5-dien-17β-ol, $\lambda_{max}$. 250 m$\mu$ ($\epsilon$=19,890) in ethanol.

EXAMPLE 36

*6-Hydroxymethyl-3-Methoxypregna-3,5-Diene-11,20-Dione*

6 - formyl - 3 - methoxypregna - 3,5 - diene - 11,20-dione hydrogenated over platinum-charcoal by the process of Example 26 gave 6-hydroxymethyl-3-methoxypregna-3,5-diene-11,20-dione, $\lambda_{max}$. 248.5 m$\mu$ ($\epsilon$=19,740) in ethanol.

EXAMPLE 37

*6-Hydroxymethyl-3-Methoxyandrosta-3,5-Dien-17-One*

6 - formyl - 3 - methoxyandrosta - 3,5 - diene - 17 - one (780 mg.) in ethanol (60 ml.) containing sodium acetate (300 mg.) was reduced with hydrogen in the presence of 5% platinum charcoal (300 mg.). After 5 hours uptake of hydrogen stopped when 1.05 mol had been absorbed. The catalyst was removed by filtration and water was added to the filtrate until crystallisation began. The product was purified from aqueous methanol and 1% pyridine to give 6-hydroxymethyl-3-methoxyandrosta-3,5-diene-17-one, needles, M.P. 143 to 146° C., $[\alpha]_D^{26}$ −111° (c. 0.91 in dioxan), $\lambda_{max}$. 249 m$\mu$ ($\epsilon$=19,000) in ethanol.

EXAMPLE 38

*21-Acetoxy-11β,17α-Dihydroxy-6-Hydroxymethyl-3-Methoxypregna-3,5-Dien-20-One*

21 - acetoxy - 6 - formyl - 11β,17α - dihydroxy - 3-methoxypregna-3,5-dien-20-one (1 g.) was hydrogenated in ethanol (15 ml.) containing sodium acetate (0.5 g.) over a 5% platinum-charcoal catalyst (0.3 g.) until one mole of hydrogen had been absorbed. The catalyst was removed by filtration and the solution poured into water to precipitate the product. Purification from aqueous methanol gave 21-acetoxy-11β,17α-dihydroxy-6-hydroxymethyl-3-methoxypregna-3,5-dien-20-one, $\lambda_{max}$. 249.5 m$\mu$ ($\epsilon$=19,800) in ethanol.

EXAMPLE 39

21-Acetoxy-9α-Fluoro-11β,17α-Dihydroxy-6-Hydroxymethyl-3-Methoxypregna-3,5-Dien-20-One

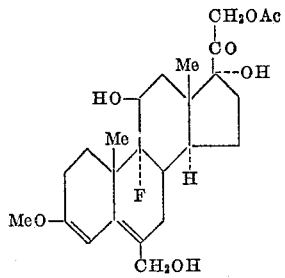

21 - acetoxy - 9α - fluoro - 6 - formyl - 11β,17a - dihydroxy-3-methoxypregna-3,5-dien-20-one, hydrogenated according to the process of the previous example, gave 21 - acetoxy - 9a - fluoro - 11β,17a - dihydroxy - 6 - hydroxymethyl-3-methoxypregna-3,5-dien-20-one, λ_max. 249 mμ (ε=18,970) in ethanol.

EXAMPLE 40

6-Hydroxymethyl Derivative of 17α-Methyltestosterone 3-Enol Methyl Ether

A solution of 17β-acetoxy-6-formyl-3-methoxy-17α-methylandrosta-3,5-diene (3.7 g.) in dry tetrahydrofuran (200 ml.) was treated with lithium aluminium hydride (3.5 g.). The mixture was heated under reflux for 3 hours, cooled, excess reducing agent was destroyed by the addition of a little acetone, and the product isolated with methylene dichloride. Purification from acetone/hexane gave 17β - hydroxy - 6 - hydroxy - methyl - 3 - methoxy-17α-methylandrosta-3,5-diene, tablets, M.P. 109 to 111° C., [α]_D^24 −142° (c. 1.02 in chloroform).

We claim:

1. A process for the preparation of 3-enol ethers of 6-hydroxymethyl-3-oxo-Δ⁴-steroids having in rings A and B of the steroid nucleus, the structure

    (I)

where R is selected from the group consisting of O-alkyl, O-hydroxyalkyl, O-cycloalkyl, O-alkaryl and a functional derivative thereof which process comprises reducing the corresponding 3-enol ether of a 6-formyl-3-oxo-Δ⁴-steroid having in rings A and B of the steroid nucleus, the structure

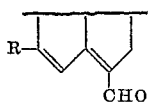    (II)

where R has the same meaning as above.

2. A process as claimed in claim 1 wherein reduction is effected catalytically employing Raney nickel as catalyst.

3. A process as claimed in claim 1 wherein the reduction is effected by catalytic hydrogenation employing platinum on charcoal in the presence of a sodium acetate buffer.

4. A process as claimed in claim 1 wherein the reducing agent is an organo metallic hydride.

5. A process as claimed in claim 1 wherein the reducing agent is selected from the group consisting of lithium borohydride and lithium cyanoborohydride.

6. 3-enol ethers of 6-hydroxymethyl-3-oxo-Δ⁴-steroids, said 3-enol ethers having in rings A and B of the steroid nucleus the structure

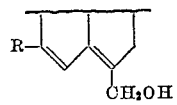

where R is selected from the group consisting of O-alkyl, O-hydroxyalkyl, O-cycloalkyl, O-alkaryl and O-alkylalkoxy.

7. 21 - acetoxy - 3 - ethoxy - 17α - hydroxy - 6 - hydroxymethyl - pregna - 3,5 - diene - 11,20 - dione.

8. 21 - acetoxy - 17α - hydroxy - 3 - [β - hydroxyethoxy] - 6 - hydroxymethylpregna - 3,5 - diene - 11,20-dione.

9. 17α,21 - diacetoxy - 6 - hydroxymethyl - 3 - methoxypregna - 3,5 - diene - 11,20 - dione.

10. 17,20:20,21 - bismethylenedioxy - 3 - ethoxy - 6-hydroxy-methylpregna-3,5-diene-11-one.

11. 17α - acetoxy - 6 - hydroxymethyl - 3 - methoxy-16-methylenepregna-3,5-dien-20-one.

12. 17α - acetoxy - 6 - hydroxymethyl - 3 - methoxypregna-3,5-dien-20-one.

13. 17α - acetoxy - 6 - hydroxymethyl - 3 - methoxy-16α-methylpregna-3,5-dien-20-one.

14. 3-ethoxy-6-hydroxymethyl - 16α,17α-isopropylidenedioxypregna-3,5-dien-20-one.

15. 6-hydroxymethyl-3-methoxypregna-3,5-dien-20-one.

16. 17β-acetoxy-3-ethoxy-6-hydroxymethyl - 2α-methylandrosta-3,5-diene.

17. 17β - acetoxy-6-hydroxymethyl-3-methoxyandrosta-3,5-diene.

18. 3-ethoxy-6-hydroxymethyl - 17β - propionoxy-17α-(prop-1′-ynyl)androsta-3,5-diene.

19. 17β-acetoxy-3-benzyloxy-6-hydroxymethylandrosta-3,5-diene.

20. 17β - acetoxy-3-ethoxy - 6 - hydroxymethyl-19-norandrosta-3,5-diene.

21. 17β-acetoxy-3-methoxy - 6 - hydroxymethyl-19-norandrosta-3,5-diene.

22. 6-hydroxymethyl - 3 - methoxy - 16 - methylpregna-3,5,16-trien-20-one.

23. 20β-acetoxy - 3 - ethoxy - 6 - hydroxymethylpregna-3,5-diene.

24. 3 - ethoxy - 6 - hydroxymethylpregna - 3,5,17(20)-trien-21-oic acid ethyl ester.

25. 6-hydroxymethyl - 3 - methoxyandrosta-3,5-dien-17-one.

26. 21 - acetoxy - 6 - hydroxymethyl-3-methoxypregna-3,5-dien-20-one.

27. 6-hydroxymethyltestololactone 3-enol methyl ether.

28. 21-acetoxy - 17α - hydroxy-6-hydroxymethyl-3-methoxypregna-3,5-diene-11,20-dione.

29. 6-hydroxymethylcortisone 17,21-acetonide 3-enol methyl ether.

30. 17β-acetoxy-3-ethoxy - 6 - hydroxymethylandrosta-3,5-diene.

31. 11α,17β-diacetoxy - 6 - hydroxymethyl-3-methoxyandrosta-3,5-diene.

References Cited in the file of this patent

Gilman: Organic Chemistry, vol. 1, 2nd ed., pp. 803–5, 1953, John Wiley and Sons, New York, N.Y.

Drehfall and Keil: J. Prak, Chem. 6, 80 (1958).